(12) United States Patent
Syed et al.

(10) Patent No.: US 11,451,806 B2
(45) Date of Patent: *Sep. 20, 2022

(54) SELECTING CONTENT TRANSMISSIONS BASED ON ENCODING PARAMETERS

(71) Applicant: Comcast Cable Communications, LLC, Philadelphia, PA (US)

(72) Inventors: Yasser F. Syed, La Crescenta, CA (US); Donald J. Wester, Colorado Springs, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,621

(22) Filed: Jun. 23, 2020

(65) Prior Publication Data

US 2020/0396469 A1   Dec. 17, 2020

Related U.S. Application Data

(63) Continuation of application No. 14/285,131, filed on May 22, 2014, now Pat. No. 10,735,719.

(51) Int. Cl.
| | | |
|---|---|---|
| *H04N 19/436* | (2014.01) | |
| *H04L 29/06* | (2006.01) | |
| *H04N 19/46* | (2014.01) | |
| *H04N 21/2343* | (2011.01) | |

(Continued)

(52) U.S. Cl.
CPC ......... *H04N 19/436* (2014.11); *H04L 65/607* (2013.01); *H04N 19/46* (2014.11); *H04N 21/23439* (2013.01); *H04N 21/23655* (2013.01)

(58) Field of Classification Search
CPC ............ H04L 65/607; H04N 21/23655; H04N 21/23439
See application file for complete search history.

(56) References Cited

U.S. PATENT DOCUMENTS

| | | | |
|---|---|---|---|
| 6,795,506 B1 * | 9/2004 | Zhang ................. | H04N 21/235 375/240.26 |
| 10,735,719 B2 * | 8/2020 | Syed ..................... | H04N 19/46 |

(Continued)

OTHER PUBLICATIONS

"Video Coding for Streaming Media Delivery on the Internet"—Gregory J. Conklin, Gary S. Greenbaum, Karl O. Lillevold, Alan F. Lippman, and Yuriy A. Reznik; IEEE Transactions on Circuits and Systems for Video Technology, vol. 11, No. 3, Mar. 2001 (Year: 2001).*

(Continued)

*Primary Examiner* — Mainul Hasan
(74) *Attorney, Agent, or Firm* — Ballard Spahr LLP (57) ABSTRACT

An example method can comprise receiving an encoding parameter associated with a first content transmission. The encoding parameter can indicate a level of complexity to encode the first content transmission. The method can comprise selecting, based on the encoding parameter, a second content transmission. The second content transmission can be encoded at a second bit rate that is different than a first bit rate of the first content transmission. The method can also comprise generating a third content transmission. The third content transmission can comprise the second content transmission.

20 Claims, 6 Drawing Sheets

(51) Int. Cl.
*H04N 21/2365* (2011.01)
*H04L 65/60* (2022.01)

(56) References Cited

U.S. PATENT DOCUMENTS

| | | | |
|---|---|---|---|
| 2006/0215760 A1* | 9/2006 | Monaco | H04N 21/8456 |
| | | | 375/E7.157 |
| 2009/0141800 A1 | 6/2009 | Larson | |
| 2010/0118697 A1* | 5/2010 | Shumate | H04N 21/23655 |
| | | | 370/230 |
| 2012/0005716 A1 | 1/2012 | Milne et al. | |
| 2013/0070839 A1* | 3/2013 | Magee | H04L 65/80 |
| | | | 375/E7.026 |
| 2013/0101052 A1 | 4/2013 | Kaye | |
| 2013/0179588 A1 | 7/2013 | McCarthy et al. | |
| 2014/0143823 A1* | 5/2014 | Manchester | H04N 21/2662 |
| | | | 725/116 |
| 2014/0355603 A1* | 12/2014 | Li | H04L 12/184 |
| | | | 370/390 |
| 2015/0085132 A1 | 3/2015 | Bekiares et al. | |
| 2015/0312651 A1 | 10/2015 | Zhuang et al. | |

OTHER PUBLICATIONS

"Streaming Video over the Internet: Approaches and Directions"—Dapeng Wu, Yiwei Thomas Hou, Wenwu Zhu, Ya-Qin Zhang, and Jon M. Peha; IEEE Transactions on Circuits and Systems for Video Technology, vol. 11, No. 3, Mar. 2001. (Year: 2001).*

Extended European Search Report issued in related application No. EP 15168886.8 dated Sep. 24, 2015.

Canadian Intellectual Property Office, T. Cartile, Office Action, dated Feb. 23, 2022, CA.

\* cited by examiner

SELECTING CONTENT TRANSMISSIONS BASED ON ENCODING PARAMETERS

CROSS REFERENCE TO RELATED PATENT APPLICATION

This application is a continuation of U.S. application Ser. No. 14/285,131, filed May 22, 2014, which is herein incorporated by reference in its entirety.

BACKGROUND

Content providers can provide multiple content streams through a transmission channel, such as a radio frequency channel. Depending on the technology providing the content, a channel can be limited in the amount of information that can pass through the channel during a given time period. Content streams can be provided through a channel at a fixed bit rate or variable bit rate, and difficulties can arise in managing the transmission of the content streams on a channel of limited bandwidth. Thus, there is a need for more sophisticated methods and systems for managing the modulation of content streams.

SUMMARY

It is to be understood that both the following general description and the following detailed description are exemplary and explanatory only and are not restrictive, as claimed. Provided are methods and systems for providing content. An example method can comprise receiving an encoding parameter associated with a first content transmission. The encoding parameter can indicate a level of complexity to encode the first content transmission. A second content transmission can be selected based on the encoding parameter. The second content transmission can be encoded at a quality, such as a second bit rate, that is different than a quality, such as a first bit rate, of the first content transmission. A third content transmission (e.g., modulated and/or multiplexed content transmission) can be generated to comprise the second content transmission.

In another aspect, an example method can comprise determining an encoding parameter indicative of a level of complexity to encode a first content transmission. The encoding parameter can be provided to a device. A request for a second content transmission based on the encoding parameter can be received from the device. The second content transmission can be encoded at a second bit rate that is different than a first bit rate of the first content transmission.

In another aspect, an example system can comprise an encoder. The encoder can be configured to encode a plurality of content transmissions, such as content streams, and determine or receive a determination of an encoding parameter. The encoding parameter can be indicative of a level of complexity to encode a content transmission of the plurality of content transmissions. The system can also comprise a device, such as a modulator and/or multiplexer, that can be configured to receive the encoding parameter from the encoder. The device can also be configured to select, based on the encoding parameter, at least one of the plurality of content transmissions. The device can further be configured to provide the selected at least one of the plurality of content transmissions as a transmission to another device (e.g., in a modulated and/or multiplexed content transmission).

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

For purposes of explanation, the subject disclosure refers to a variety of different streams (e.g., content streams), but it should be understood that the present methods and systems can be implemented with other types of transmissions, such as file transfers, and/or the like. The present disclosure relates to methods and systems for providing content. An example system can comprise an encoder and a modulator (e.g., multiplexer). The encoder can encode a source stream into a plurality of content streams at different bit rates. For example, the content streams at different bit rates can be content streams configured for adaptive bit rate streaming. The encoder can determine one or more encoding parameters for a content stream. The encoder can embed the one or more encoding parameters in the content stream. In another aspect, the encoder can provide the one or more encoding parameters in another stream.

The modulator can identify encoding parameters in the content stream (or the other stream). In one aspect, the modulator can comprise a statistical multiplexer configured to provide several content streams in a content channel (e.g., a portion of radio frequency spectrum designated as a channel). In one aspect, the content channel can have a fixed bandwidth or a fixed maximum bandwidth. The modulator can determine that a first content stream is increasing or decreasing in complexity to encode. The increased complexity can cause the first content stream to increase in bandwidth. In order to compensate for the increase in bandwidth for the first content stream, the modulator can identify a second content stream that can have its bit rate adjusted. For example, the modulator can request a lower bit rate version of second stream in place of the higher bit rate second content stream. For example, the lower bit rate version of the second content stream can comprise the same content (e.g., show, movie, program) as the higher bit rate second content stream. Switching from the second content stream to the lower bit rate second content stream can allow the first content stream to increase in bandwidth yet remain within the bandwidth constraints of the channel. In one aspect, the modulator can be configured to adjust the content stream within a channel when the encoding parameter indicates that the level of complexity to encode a content stream is decreased. For example, if the first content stream decreases in complexity to encode, the modulator can be configured to request the higher bit rate version of the second content stream in place of the lower bit rate version of the second content stream.

Figure 1:
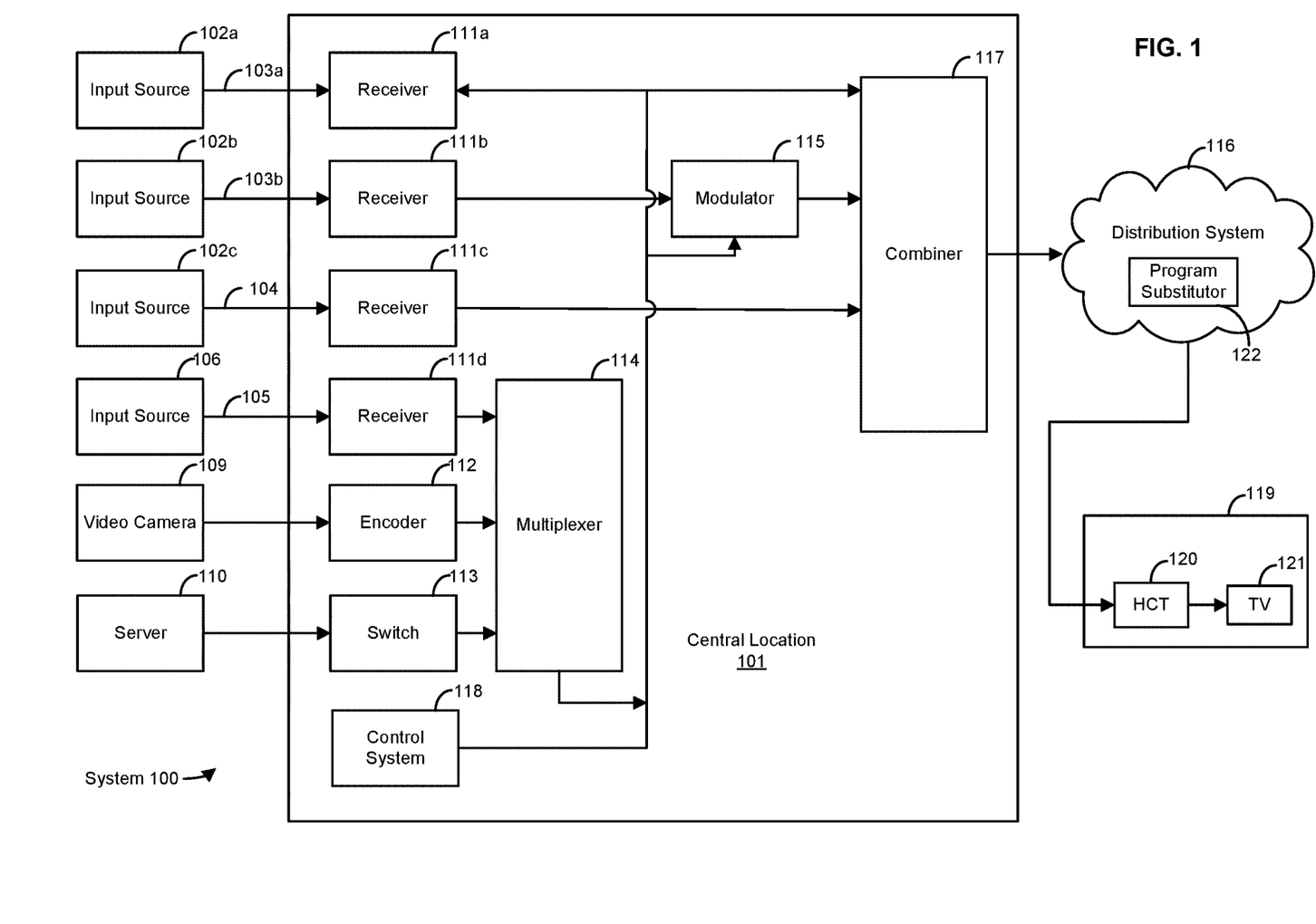
FIG. 1 is a block diagram illustrating various aspects of an exemplary system in which the present methods and systems can operate.

FIG. 1 is a block diagram illustrating various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102*a*, 102*b*, 102*c*. The content can be transmitted from the source to the central location 101 via a variety of transmission paths, including wireless (e.g. satellite paths 103*a*, 103*b*) and terrestrial path 104. The central location 101 can also receive content from a direct feed source 106 via a direct line 105. Other input sources can comprise capture devices, such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an exemplary embodiment, the methods and systems disclosed can be located within one or more encoders 112 and/or modulators 115. For example, the encoder 112 can be configured to determine encoding parameters indicative of a level of complexity to encode a content stream. The encoder 112 can insert the encoding parameters in the content stream. As a further example, the modulator 115 can be configured to detect the encoding parameters in the content stream. The modulator 115 can be configured to modulate content streams based on the encoding parameters. For example, the modulator 115 can perform a statistical multiplexing operation on multiple content streams to provide the content streams together in an allocation of radio wave spectrum. The modulator 115 can adjust the multiplexing operation by switching between content streams of different bit rates. For example, the modulator 115 can switch to a content stream of increased or decreased level of difficult to encode in response to another content stream increasing or decreasing in level of difficult to encode.

Additionally, the present methods and systems disclosed can be located in the distribution system 116. For example, the distribution system 116 can comprise a content server configured to provide content to users. The distribution system 116 can also comprise a packager configured to fragment content streams into a plurality of content fragments. The content server can provide the content fragments to users through a packet switched network (e.g., internet protocol based network). In one aspect, the content streams provided by the encoder can be distributed through the content server and/or through other network devices in a modulation based network (e.g., quadrature amplitude modulation based network) within the distribution system 116. For example, a plurality of content streams generated at a plurality of bit rates can be used for distribution as adaptive bit rate streaming. These same content streams can be used by the modulator 115. For example, the modulator 115 can request a lower or higher bit rate version of a content stream to adjust bandwidth usage of content streams within a channel.

In an aspect, the methods and systems can utilize digital audio/video compression, such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi-program transport stream. A multi-program transport stream has a program clock reference (PCR) mechanism that allows transmission of multiple clocks, one of which is selected and regenerated at the decoder.

A multi-program transport stream is more than just a multiplex of audio and video PESs. In addition to the compressed audio, video and data, a transport stream includes metadata describing the bit stream. This includes the program association table (PAT) that lists every program in the multi-program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi-program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi-program transport stream carries many different programs and each may use a different compression factor and a bit rate that can change dynamically even though the overall bit rate stays constant. This behavior is called statistical multiplexing and it allows a program that is handling difficult material to borrow bandwidth from a program that is handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

Figure 2:
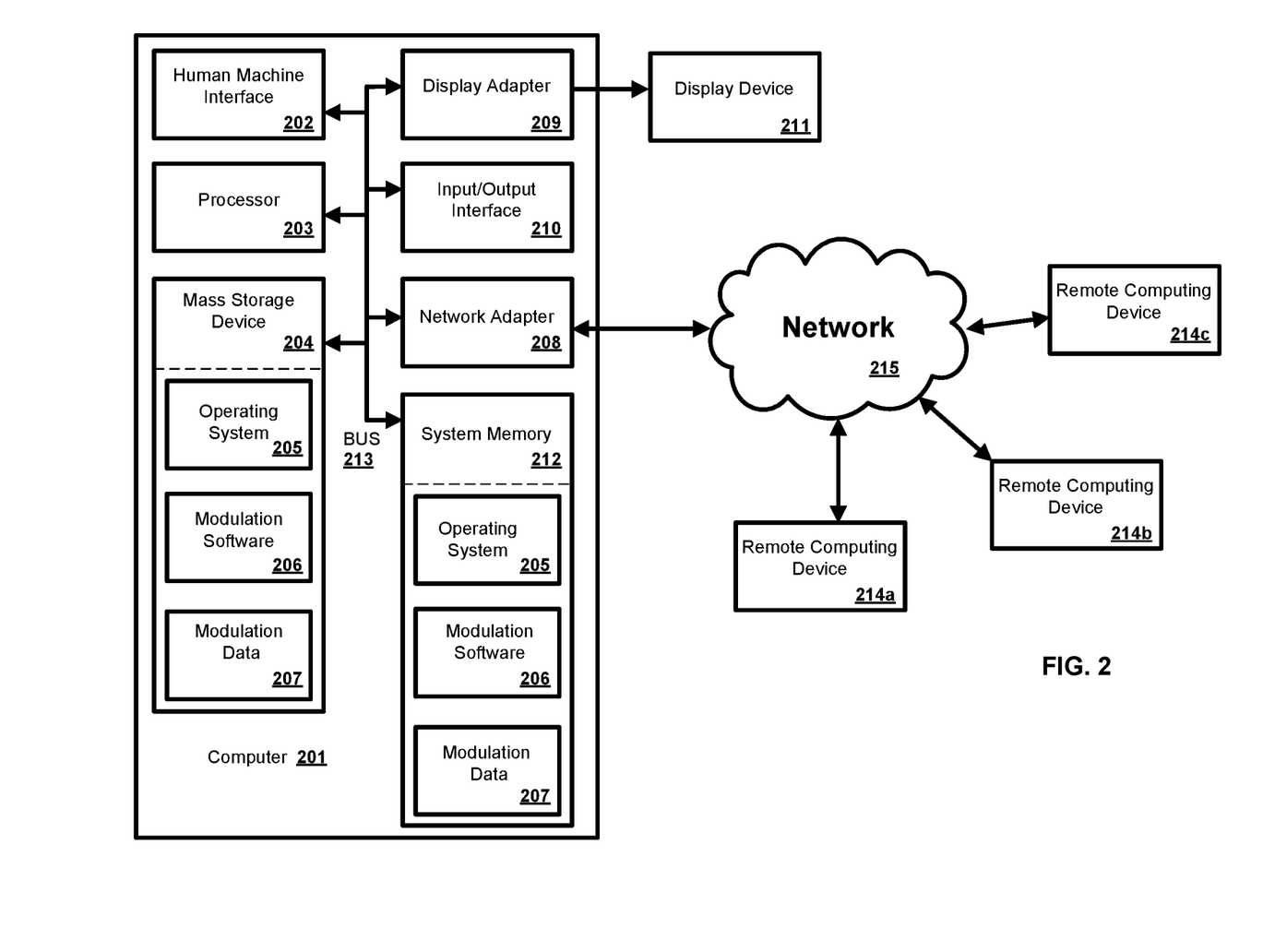
FIG. 2 is a block diagram illustrating an example computing system in which the present methods and systems can operate.

In an exemplary aspect, the methods and systems can be implemented on a computer 201 as illustrated in FIG. 2 and described below. By way of example, server 110 of FIG. 1 can be a computer as illustrated in FIG. 2. As another example, the first device 302, second device 312, and/or third device 316 of FIG. 3 can be computers as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, modulation (e.g., multiplexing) software 206, modulation (e.g., multiplexing) data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as modulation data 207 and/or program modules such as operating system 205 and modulation software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and modulation software 206. Each of the operating system 205 and modulation software 206 (or some combination thereof) can comprise elements of the programming and the modulation software 206. Modulation data 207 can also be stored on the mass storage device 204. Modulation data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices, such as gloves and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components, such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 205, are illustrated herein as discrete blocks, although it is recognized that such programs and components reside at various times in different storage components of the computing device 201, and are executed by the data processor(s) of the computer. An implementation of modulation software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
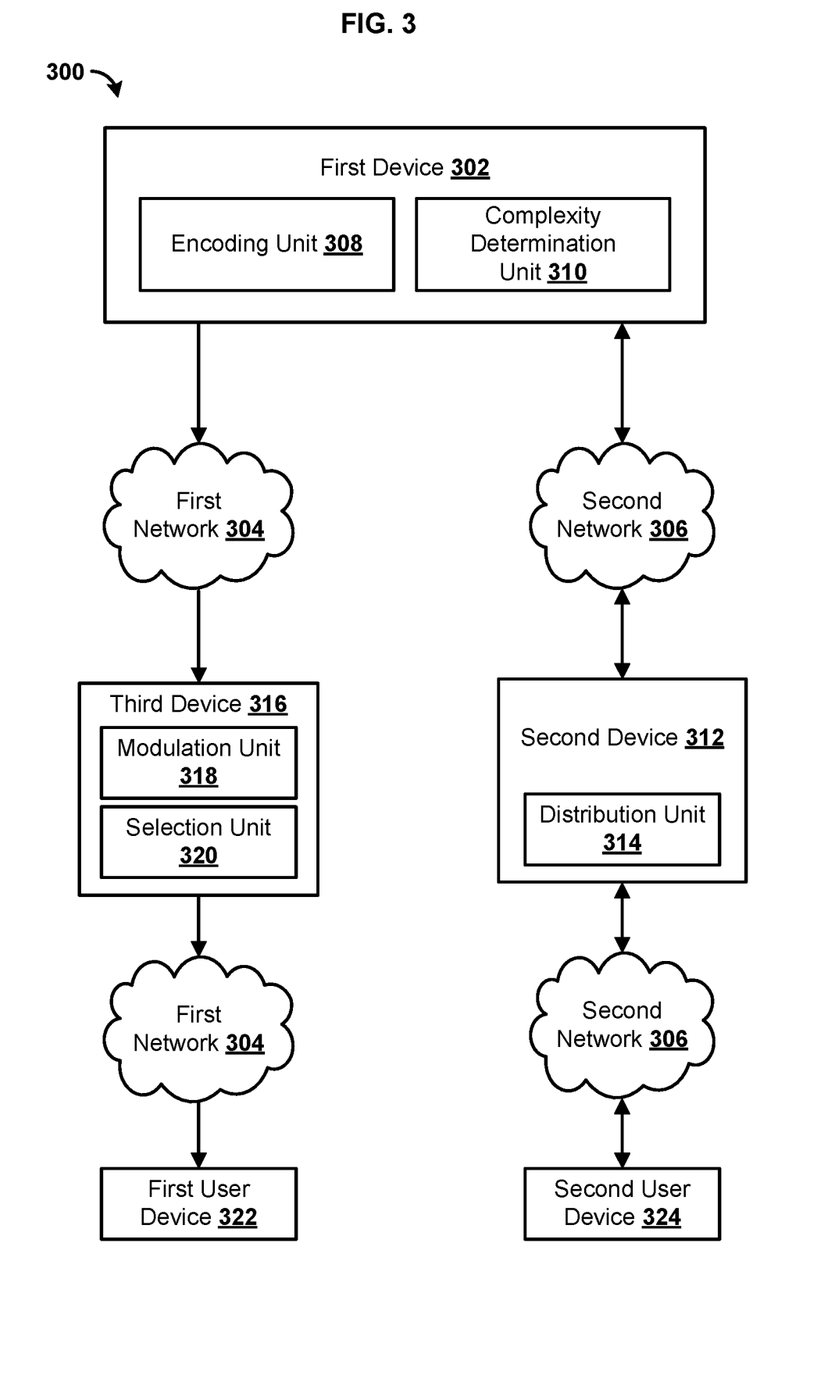
FIG. 3 is a block diagram illustrating an example system for providing content.

FIG. 3 is a block diagram illustrating an example system 300 for providing content. In one aspect, the system 300 can comprise a first device 302. The first device 302 can be configured to provide content through a first network 304 and a second network 306. In one aspect, the first network 304 and/or second network 306 can comprise a packet switched network (e.g., internet protocol based network), a non-packet switched network (e.g., quadrature amplitude modulation based network), and/or the like. For example, the first network 304 can comprise a packet switched network. The second network 306 can comprise a modulation based network (e.g., quadrature amplitude modulation, quadrature phase-shift keying modulation). The first network 304 and/or second network 306 can comprise network adapters, switches, routers, and the like connected through wireless links (e.g., radio frequency, satellite) and/or physical links (e.g., fiber optic cable, coaxial cable, Ethernet cable). In one aspect, the first network 304 and/or second network 306 can be configured to provide communication from telephone, cellular, modem, and/or other electronic devices to and throughout the system 300.

In one aspect, the first device 302 can comprise an encoding unit 308. The encoding unit 308 can be configured to encode one or more content streams. For example, the encoding unit 308 can comprise one or more encoders configured to receive content and encode the content into one or more content streams. In one aspect, the encoding unit 308 can encode one or more source content streams into a plurality of content streams. The plurality of content streams can be encoded at different bit rates. In one aspect, the encoding unit 308 can encode the content into a compressed and/or encrypted format. For example, the encoding unit 308 can encode the content into an MPEG stream.

In one aspect, the encoding unit 308 can be configured to perform intra-frame and inter-frame encoding (e.g., compression). For example, intra-frame encoding can comprise encoding a frame of content, such as a video frame, by reference to the frame itself. Inter-frame encoding can comprise compressing a frame of content, such as video frame, by reference to one or more other frames. As an illustration, an intra-coded frame ("I-frame") can comprise a frame of content that is encoded without reference to other frames. A predictive coded frame ("P-frame) can comprise a frame of content encoded with reference to another frame, such as an I-frame. A bi-directionally predictive coded ("B-frame") frame can comprise a frame of content encoded with reference to multiple frames. For example, the encoding unit 308 can be configured to encode a content stream into a plurality of I-frames, P-frames, and B-frames. The plurality of I-frames, P-frames, and B-frames can be organized into groups, each group known as a group of frames and/or group of pictures (GOP).

In one aspect, encoding a frame of content with reference to another frame can comprise encoding one or more motion vectors configured to correlate a portion of the encoded frame to a portion of a referenced frame. The motion vectors can indicate a difference in location between one or more pixels of the encoded frame and one or more identical or similar pixels in the reference frame. A motion vector can comprise, for example, a direction and distance between two points in a coordinate system. As another example, a motion vector can comprise a coordinate in a reference frame and a coordinate in the encoded frame. By way of explanation, an I-frame can be encoded by encoding all the pixels in a frame. P-frames or B-frames can be encoded without encoding all of the pixels in a frame. Instead, motion vectors can be encoded that associate (e.g., correlate) portions (e.g., pixels) of a reference frame and the location thereof to portions of an encoded frame and the location thereof. If a portion of a reference frame identified by a motion vector is not identical to the associated portion of the frame being encoded, then the encoding unit 308 can identify differences between the portion of the reference frame referenced by the motion vectors and the portion of the frame being encoded. These differences are known as prediction errors.

In one aspect, the encoding unit 308 can be configured to perform one or more transformation algorithms on the content. For example, the encoding unit 308 can be configured to perform a discrete cosine transform. In one aspect, a transformation algorithm can comprise expressing the content as a summation of functions (e.g., a summation of cosine functions). The functions can be related according to a formula. For example, each function can be raised to exponents, multiplied by coefficients, and/or provided arguments based on a summation formula. In one aspect, at least a portion of the content can be transformed according to a transformation algorithm. The coefficients of the functions resulting from the transformation algorithm can be encoded and transmitted as encoded content. For example, the encoding unit 308 can be configured to encode only a portion of the coefficients resulting from the transformation algorithm.

In one aspect, the encoding unit 308 can be configured to quantize the content and/or encoded data indicating the content (e.g., coefficients resulting from a transformation algorithm). Quantization can comprise converting content and/or encoded data into a smaller set of content and/or encoded data. For example, the coefficients can comprise an integer (e.g., 299792458) and/or a non-integer (e.g., 1.618033) real number. In one aspect, the encoding unit 308 can be configured to quantize a coefficient by truncating, rounding, or otherwise reducing the number of digits in a number. For example, the example coefficient 1.618033 can be quantized to 1.618. The amount of quantization can be based on a quantization step size. A smaller quantization step size results in the loss of less data than a larger quantization step size. For example, a larger quantization step size can result in a quantized coefficient of 1.61 and a smaller quantization step size can result in a quantized coefficient of 1.61803.

In one aspect, first device 302 can comprise a complexity determination unit 310. The complexity determination unit 310 can determine the level of complexity to encode content into a content stream. For example, the complexity determination unit 310 can be configured to determine one or more encoding parameters indicative of a level of complexity to encode content. In one aspect, an encoding parameter can comprise a value related to an operation performed in encoding the content. For example, the encoding parameter can comprise a measurement of a number of aspects (e.g., calculations, values, groupings, averages) of the operation and/or results of the operation. As another example, the value can comprise a relative value (e.g., low, medium, high) indicating a relative complexity to the operation performed on other content.

In one aspect, the encoding parameters can comprise an encoding quantization level. In one aspect, the encoding quantization level can be based on the number of coefficients encoded from the transformation algorithm. For example, the encoding quantization level can be a measurement of the number of coefficients encoded for one or more frames (e.g., a group of pictures) of encoded content. For example, the transformation algorithm can assign a coefficient to a number of values within range of a coefficient (e.g., coefficients of 1.1 and 0.9 could be represented as 1). Such ranges can be considered as quantization buckets or bins. The quantization level can be indicative of a number of pixel values assigned to a coefficient. The encoding parameter can comprise a number value indicating the quantization level (e.g. for a frame or group of frames). The encoding parameter can also comprise an average of the number values indicating the quantization level, an evaluation (e.g., high, medium, low) of the number value indicating a quantization level with respect to a threshold, and/or the like.

As an illustration, the quantization levels can be categorized as high, medium, or low based on the size of the ranges of coefficients (e.g., quantization buckets or bins) used in a transformation algorithm. In one aspect, the quantization levels can be categorized as high, medium, or low based on comparison of the ranges of the coefficients to average sizes of the ranges of coefficients. As another example, quantization levels can be categorized as high, medium, or low based on the percentage of coefficients that reside in a dead zone. For example, a dead zone can be a range of values around a zero-output region of the quantization algorithm.

As another example, the encoding parameter can comprise information based on one or more prediction errors in encoding inter-coded frames, such as P-frames or B-frames. For example, the prediction error can comprise a measurement of differences between references frames and encoded frames. As a further example, the prediction error can comprise a difference between pixel values (e.g., 0 through 255) of a reference frame as compared to a decoded frame. As an illustration, the encoding parameter can indicate a number of times prediction errors are generated in encoding one or more frames (e.g., in a group of pictures). For example, a prediction error can be generated when a mapping one or more portions (e.g., pixels) of the reference frame to one or more portions of a frame (e.g. pixels) being encoded. The encoding parameter can comprise a number of prediction errors (e.g., for one or more pixels, groups of pixels, frames, groups of frames), an average of the number of prediction errors, an evaluation (e.g., low, medium, high) of the number of prediction errors with respect to a threshold, and the like.

As an illustration, the prediction error can be normalized against each candidate frame from a group of frames to be encoded. Low, medium, and high values can be determined based on a comparison to standard deviations from the norm (e.g., mean or average value). For example, a prediction error can be considered low if the prediction error is below one standard deviation from the norm. A prediction error can be considered medium if the prediction error is within one standard deviation from the norm. A prediction error can be considered high if the prediction error is above one standard deviation from the norm.

As another example, the encoding parameter can be based on the number of motion vectors to encode a frame. For example, motion vectors can be used to correlate the location of a portion of a reference frame to a portion of a frame being encoded. The complexity determination unit 310 can be configured to count the number of motion vectors used to encode a frame and/or a group of frames. In another aspect, the complexity determination unit 310 can be configured to measure the size of one or more motion vectors of an encoded frame. For example, the complexity determination unit 310 can calculate the distance between a portion of a reference frame and a portion of an encoded frame associated by a motion vector. In one aspect, the complexity determination unit 310 can calculate the distance by performing one or more calculations, such as: an absolute value operation, a magnitude operation, determining subcomponents of the motion vector, calculating a motion vector length based on Pythagorean's theorem, calculating the value of a trigonometric function (e.g., sine, cosine, tangent, cotangent), determining the difference between a coordinate at a point in the reference frame from a coordinate at a point in the encoded frame, and the like. The encoding parameter can comprise one or more determined values (e.g., number of motion vectors, length of motion vectors), an average of determined values, an evaluation (e.g., low, medium, high) of determined values with respect to a threshold, and/or the like.

As an illustration, motion vector values can be determined as high, medium, based on a comparison to an average (e.g., real-time average) distance of movement indicated by the motion vectors. By way of explanation, content can be transmitted as a sequence of macroblocks. A macroblock can comprise a predefined portion of a video stream, such a section of an image comprising a predefined number of pixels of the image. The motion vectors can be associated with macroblocks and can have a value of zero (e.g., if the macroblock is not moving or skipped), a value of one (e.g., if part of a whole object move), or more than one to indicate more complex motion movement situations. In one aspect, categorization of low, medium, or high motion vector values can be based on a comparison of the number of moving macroblocks to a total number of macroblocks. In another aspect, the categorization of low, medium, or high motion vector values can be based on a comparison of the number of motion vectors used in a group of pictures to an average number of motion vectors over a time period. In another aspect, the motion vector values can be categorized as high, medium, or low based on distance of movement of the motion vectors. The high, medium, and low values can be based on a comparison to a standard, such as a threshold or normalized value.

As another example, the encoding parameter can comprise a quantizing step size. The quantization step size can comprise a measure of the amount of information stored in each coefficient generated by a transformation operation. For example, the measurement can indicate a number of digits of the coefficient retained after the coefficients are truncated, rounded, or otherwise reduced. As an illustration, an example coefficient 1.618033 can be reduced in data size. A reduction to 1.6 would be indicated by a larger quantization step size than a reduction to 1.618. The encoding parameter can comprise one or more determined quantization step sizes, an average of determined quantization step sizes, an evaluation (e.g., low, medium, high) of determined values with respect to a threshold, and/or the like. As an illustration, quantization step size can be determined as high, medium, or low based on comparison to an average quantization step size.

As another example, the encoding parameter can comprise a comparison of an inter-coded frame to an intra-coded frame. For example, the complexity determination unit 310 can compare the size (e.g., data storage size) of the intra-coded frame to the size of an inter-coded frame. As an illustration, an I-frame can be compared to one or more P-frames and/or B-frames. In one aspect, the size of the I-frame can be compared to the size of one or more P-frames and/or B-frames. As an example, the size can be based on the number of bytes of the frame. In another aspect, the encoding parameter can comprise the comparison (e.g., the size of the difference) of intra-coded frame to more than one inter-coded frames. For example, the encoding parameter can be an average of comparisons for a group of frames. The encoding parameter can also comprise a value based on evaluating the comparison with respect to a threshold. For example, the comparison of the intra-coded frame to the inter-coded frame can be evaluated to be low, medium, high, or the like. As an illustration, B or P frames that are 0.4 the size of an I-frame or less can be considered low, values between 0.4 and 0.6 can be medium, and values above 0.6 can be considered high. As a further illustration, the ratios can be determined indirectly. For example, the number of prediction errors generated in predicting the P and B frames with motion vectors can be indicative of a higher relative size of the P and B frames compared to the I-frame.

In one aspect, the system 300 can comprise a second device 312. The second device 312 can be configured to receive content from the first device 302. For example, the second device 312 can access a plurality of content streams encoded by the encoding unit 308 of the first device 302. In one aspect, the second device 312 can comprise a distribution unit 314. For example, the distribution unit 314 can be configured to distribute content as one or more content streams over the second network 306. For example, the distribution unit 314 can be configured to divide (e.g., virtually and/or physically) the one or more content streams into data fragments for distribution over a packet switched network. As a further example, the second network 306 can comprise an Internet protocol based network or other packet switched network configured for distributing data fragments. The distribution unit 314 can also be configured to function as a server to receive and process requests for content through the second network 306.

In one aspect, the system 300 can comprise a third device 316. The third device 316 can be configured to receive content from the first device 302. The third device 316 can be configured to provide the content as one or more modulated content streams. For example, the third device 316 can comprise a modulation unit 318 configured to combine one or more content streams into a modulated content stream. For example, the modulation unit 318 can be configured to use multiplexing techniques, such as statistical multiplexing, to transmit multiple content streams on a physical channel (e.g., frequency allocation). In one aspect, the modulation unit 318 can be configured to provide the content using analog modulation (e.g., such as quadrature amplitude modulation), digital modulation (e.g., quadrature phase-shift keying), or other modulation techniques.

In one aspect, the third device 316 can comprise a selection unit 320. The selection unit 320 can be configured to select content streams for modulation by the modulation unit 318. For example, the selection unit 320 can be configured to identify encoding parameters associated with content streams received by the third device 316. For example, the selection unit 320 can identify the encoding parameters in the content streams. As an illustration, the selection unit 320 can identify the encoding parameters in a metadata field of the content stream, such as a private adaptation field of an MPEG stream. As another example, the selection unit 320 can receive the encoding parameters separate from the content streams with which the encoding parameters are associated.

In one aspect, the selection unit 320 can be configured to select content streams based on encoding parameters. For example, the third device 316 can receive a first content stream. The selection unit 320 can identify an encoding parameter associated with the first content stream. In one aspect, the selection unit 320 can be configured to determine whether to select another content stream based on the encoding parameter. For example, the encoding parameter can indicate that the level of difficulty to encode the first content is stream is increasing or decreasing. As a further example, an encoding parameter can predict that the first content stream will increase or decrease in size, bandwidth, bit rate, or the like.

In one aspect, the selection unit 320 can be configured to compare encoding parameters to one or more threshold values. If an encoding parameter is above a first threshold value, then the selection unit 320 can determine to select a second content stream from the first device 302. As another example, if an encoding parameter is below a second threshold, then the selection unit 320 can determine to select the second content stream. As a further illustration, if a number of encoding parameters identified in the first content stream over a time period are above or below a threshold, then the selection unit 320 can determine to select the second content stream. For example, an encoding parameter can be identified over a time period for every frame, group of frames (e.g., group of pictures), scene, and the like for the first content stream.

In one aspect, the selection unit 320 can be configured to compare encoding parameters to one or more previous encoding parameters. For example, the selection unit 320 can be configured to determine if one or more encoding parameters are less than or greater than one or more previous encoding parameters. As a further example, the selection unit 320 can be configured to determine if the encoding parameters are increasing or decreasing over time. For example, the selection unit 320 can identify a trend in the change of encoding parameters over time. The selection unit 320 can be configured to retrieve a content stream of lower bit rate or higher bit rate based on the trend. For example, the selection unit 320 can be configured to predict a future complexity to encode a content stream based on the trend. If the predicted future complexity to encode a content stream is greater than or lower than a threshold, the selection unit 320 can retrieve a content stream of lesser or greater bit rate. For example, the encoding parameter can be detected in a first content stream. The selection unit 320 can identify a second content stream that can be switched from a first bit rate to a second bit rate. Then, the selection unit 320 can switch from the second content stream to a third content stream at a second bit rate (e.g., having the same content as the second content stream).

In one aspect, the selection unit 320 can be configured to select a second content stream to adjust bandwidth allocation within the modulated content stream. For example, the second content stream can be selected to adjust bandwidth for at least one of the first content stream and a third content stream. Before the second content stream is selected, the first content stream and the third content stream can be provided together in a modulated content stream. After the second content stream is selected, the first content stream can be provided together with the second content stream in the modulated content stream. For example, the second content stream can be selected instead of the third content stream.

As an example, the encoding parameter can indicate that the first content stream is increasing or decreasing in a level of difficulty to encode. The level of difficulty to encode can be used as a predictor for future bandwidth (e.g., bit rate) and/or an indicator of current bandwidth (e.g., bit rate) consumed in transmitting a content stream. For example, an increase in the level of difficulty to encode for the first content stream can indicate and/or suggest that the first content stream currently is and/or will consume additional bandwidth to transmit the first content stream in the modulated content stream. To compensate for the additional bandwidth consumed by the first content stream, the selection unit 320 can identify a second content stream that can be replaced with a third content stream with decreased bandwidth. For example, the third content stream can be provided with the first content stream as a modulated content stream. Similarly, a decrease in the level of difficulty to encode for the first content stream can indicate and/or suggest that the first content stream currently is consuming and/or will consume less bandwidth to transmit the first content stream in the modulated content stream. To compensate for the decreased bandwidth consumed by the first content stream, the selection unit 320 can identify that the third content stream can be replaced with the second content stream (e.g., because the second content stream consumes increased bandwidth as compared to the third content stream). In this case, the second content stream can be provided with the first content stream as a modulated content stream.

In one aspect, one or more of the content streams (e.g., first content stream and other content streams) can be associated with one or more priority levels (e.g., bandwidth priority level). In one aspect, the selection unit 320 can be configured to identify the second content stream because the second content stream is associated with a lower priority level (e.g., lowest priority) than the priority levels of other content streams provided with the first content stream as a modulated content stream. The priority levels can be identified based on a table or other data correlating the program identifier of content streams with priority levels. For example, the selection unit 320 can be configured to identify the program identifier of content streams and determine the corresponding priority levels. The selection unit 320 can be configured to identify content streams with lower priority levels if the first content stream is increasing in complexity to encode. The selection unit 320 can be configured to identify content streams with higher priority levels if the first content stream is decreasing in complexity to encode.

As an illustration, a priority level can be based on bandwidth. A lower priority level can be associated with a content stream of lower bandwidth than the bandwidth of other streams. In one aspect, the priority level can be determined from a variety of sources, such as from a hardware configuration file associating a multicast port with a program identifier (PID), a Program Map Table associated with each content stream, bandwidth information in the manifest associated with a content stream, and/or direct measurement of the content streams. As another illustration, a priority level can be based on measurement of different types of encoding parameters in the content stream. For example, the most significant bit of the encoding parameters can be aggregated over time. The total priority of a content stream can be calculated based on the aggregated value of each of the encoding parameters. A content stream with the highest aggregated values can be given priority over content streams with lower aggregated values.

It should be noted that even though FIG. 3 illustrates the second device 312 and the third device 316 as separate devices, the second device 312 and third device 316 can be implemented on the same device. For example, the second device 312 and/or third device 316 can be implemented on the first device 302. The second device 312 and third device 316 can be communicatively coupled through one or more network links, such as the first network 304 and second network 306. As an illustration, the second device 312 can be configured to provide content through modulation based transmission, such as a quadrature amplitude modulation (QAM), quadrature phase shift keying (QPSK), and/or the like based network. The third device 316 can be configured to provide content through a packet switched network, such as an internet protocol based network.

In one aspect, the system 300 can comprise user devices. For example, the system 300 can comprise a first user device 322. The first user device 322 can be communicatively coupled to the third device 316 through the first network 304. In one aspect, the first user device 322 can be configured to request and receive content from the third device 316. For example, the first user device 322 can comprise a tuner configured to tune to a channel frequency to receive modulated content from the third device 316. The first user device 322 can also comprise a demodulator configured to demodulate and/or demultiplex the modulated content streams. The first user device 322 can also comprise a decoder configured to decode the demodulated and/or demultiplexed content streams received from the third device 316.

In one aspect, the system 300 can comprise a second user device 324. The second user device 324 can be configured to request and receive content from the second device 312 through the second network 306. For example, the second user device 324 can request content streams from the second device 312. In one aspect, the second user device 324 can be configured to receive content through adaptive bit rate content streaming. In another aspect, the second user device 324 can comprise a decoder configured to decode content from the received content streams. In scenarios where the second device 312 and/or third device 316 is implemented in the first device 302, the first user device 322 and/or second user device 324 can be configured to receive content (e.g., modulated or packetized) directly from the first device 302 via the first network 304 and/or second network 306.

Figure 4:
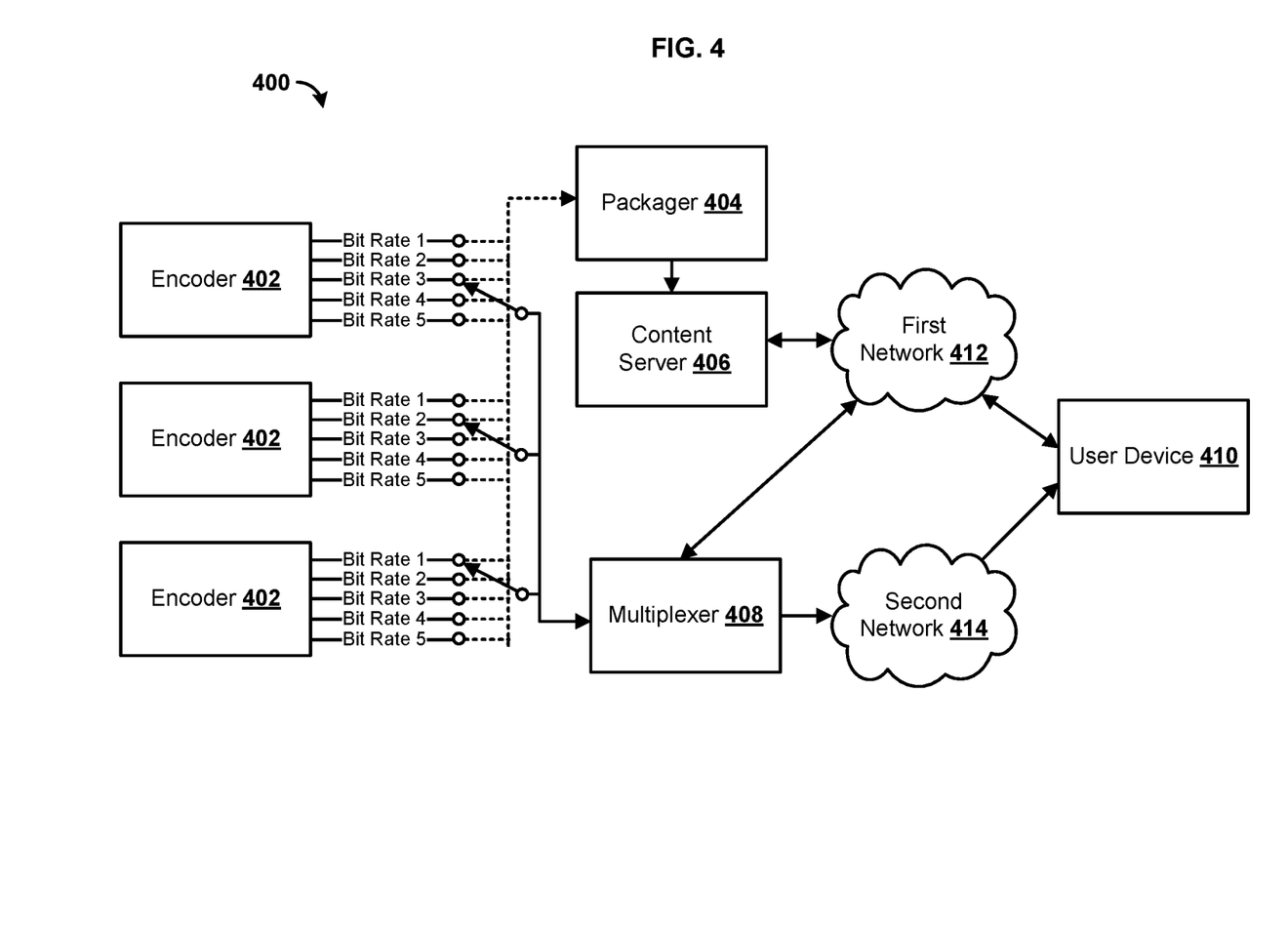
FIG. 4 is a block diagram illustrating another example system for providing content.

FIG. 4 is a block diagram illustrating another example system 400 for providing content. In one aspect, the system 400 can comprise one or more encoders 402. The encoders 402 can be configured to encode one or more source content streams into a plurality of content streams at various bit rates (e.g., bit rate 1 through bit rate 5). For example, each encoder 402 can receive a different source content stream. Each encoder 402 can be configured to encode the received source content stream into one or more content streams at different bit rates. As a further example, the encoders 402 can be configured to encode content streams configured for adaptive bit rate streaming.

In one aspect, the encoders 402 can be configured to determine one or more encoding parameters. The encoding parameters can be based on the encoding of one or more content streams being encoded by the encoder 402. In one aspect, the encoding parameters can be as described herein. For example, the encoding parameter can comprise at least one of an encoding quantization level (e.g., size of coefficient range for grouping coefficients), a predictive frame error, a relative size of an inter-coded frame with respect to an intra-coded frame, a number of motion vectors to encode a frame, a quantizing step size (e.g., bit precision), and the like. As a further example, the encoding parameter can comprise a value indicating at least one of a low complexity to encode, a medium complexity to encode, or a high complexity to encode. In one aspect, the encoders 402 can be configured to insert the encoding parameters into the content streams or otherwise provide the encoding parameters to other devices (e.g., the multiplexer 408). For example, the encoding parameters can be inserted into a metadata field of a content stream, such as a private adaptation field of an MPEG stream.

In one aspect, the system 400 can comprise a packager 404. In one aspect, the packager 404 can be configured to receive the one or more content streams from the encoders 402. The packager 404 can be configured to prepare the content streams for distribution. For example, the packager 404 can be configured to convert content streams into a plurality of content fragments. In one aspect, the packager 404 can be configured to provide content streams according to adaptive bit rate streaming. For example, the packager 404 can be configured to convert the content streams into one or more adaptive bit rate streaming formats, such as Apple HTTP Live Streaming (HLS), Microsoft Smooth Streaming, Adobe HTTP Dynamic Streaming (HDS), MPEG DASH, and the like. In one aspect, the packager 404 can pre-package the content streams or provide packaging in real-time as content streams are requested by users.

In one aspect, the system 400 can comprise a content server 406. For example, the content server 406 can be configured to receive requests for content, such as the content streams. In one aspect, the content server 406 can identify the location of the content and provide the content to a device requesting the content (e.g., user device 410). As an illustration, the content server 406 can comprise a Hypertext Transfer Protocol (HTTP) Origin server. For example, the content server 406 can be configured to provide a communication session with a requesting device based on HTTP, FTP, or other protocols.

In one aspect, the system 400 can comprise a multiplexer 408. The multiplexer 408 can be configured to modulate content streams received from the encoders. For example, the multiplexer 408 can comprise the modulator of FIG. 3. In one aspect, the multiplexer 408 can be configured to receive encoding parameters from the encoders 402. For example, the multiplexer 408 can identify the encoding parameters in the content streams or otherwise receive the encoding parameters from the encoders 402. In one aspect, the multiplexer 408 can multiplex and/or modulate the content streams based on one or more encoding parameters. As shown by the pivoting arrows (e.g., pivot point is illustrated by an empty circle) of FIG. 4, the multiplexer 408 can adjust the modulated stream by switching from a content stream at one bit rate to the same content stream at another bit rate. For example, as the encoding parameter indicates that that the level of difficulty to encode a content stream increases or decreases, the multiplexer 408 can be configured to switch to and/or select one or more content streams with higher bit rates or lower bit rates. For example, an encoding parameter associated with (e.g., received in) a first content stream can be the basis of switching between a second content stream and a third content stream. As another example, an encoding parameter associated with (e.g., received in) a first content stream can be the basis for switching between the first content stream and a second content stream. For example, the content streams encoded at different bit rates for the packager 404 can be accessed by the multiplexer 408. The multiplexer 408 can switch between content streams encoded for the packager 404 in the process of generating a modulated content stream. In one aspect, the multiplexer can receive a list (e.g., manifest file) of available content streams from one or more of the encoders 402 or otherwise determine available content streams for selection.

In one aspect, the system 400 can comprise a user device 410. The user device 410 can be configured to receive content from the content server 406 through a first network 412. In one aspect, the first network 412 can comprise a packet switched network, such as an internet protocol based network. For example, the user device 410 can receive content as an adaptive bit rate stream. As an illustration, the user device 410 can receive a manifest file from the content server 406. The manifest file can comprise a list of content fragments and/or content streams at different bit rates. The user device 410 can request content fragments and/or content streams based on the manifest file from the content server 406. For example, as the bandwidth of the first network changes or the processing availability of the user device 410 fluctuates, the user device 410 can request content fragments and/or content streams of higher or lower bit rates.

The user device 410 can be configured to receive content from the multiplexer 408 though a second network 414. For example, the user device 410 can comprise a tuner configured to receive a modulated content stream. For example, the multiplexer 408 can provide content streams in a quadrature amplitude modulation based content stream. In one aspect, the system 400 can comprise additional user devices configured to receive content through the first network 412 and/or second network 414.

Figure 5:
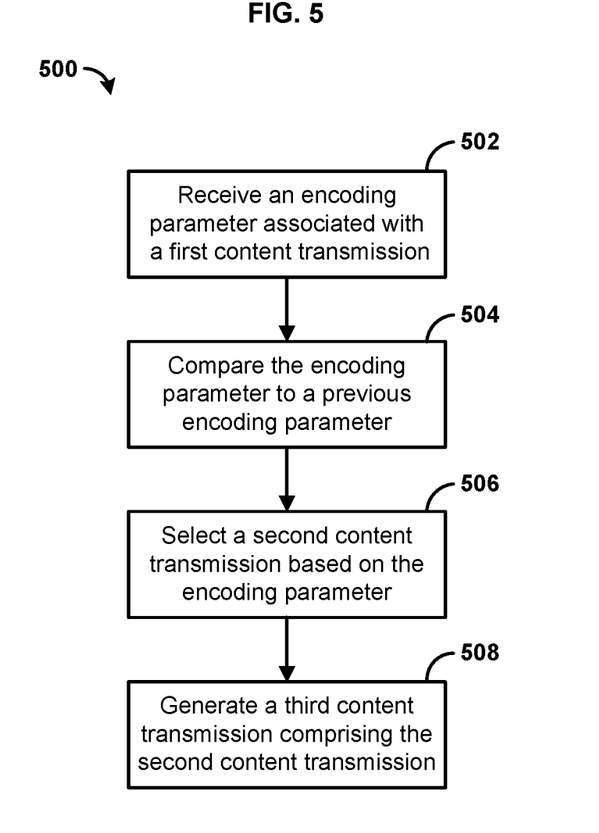
FIG. 5 is a flowchart illustrating an example method for providing content.

FIG. 5 is a flowchart illustrating an example method 500 for providing content. At step 502, an encoding parameter associated with a first content transmission (e.g., first content stream) can be received. For example, the first content transmission can be encoded at a first bit rate. In one aspect, the encoding parameter can indicate a level of complexity to encode the first content transmission. In one aspect, the encoding parameter can be received in at least one of a metadata field of the first content transmission and a data transmission separate from the first content transmission. For example, the metadata field of the first content transmission can comprise an adaptation field, such as a private adaptation field (e.g., in an MPEG stream) of the first content transmission. In one aspect, the encoding parameter can be one of a plurality of encoding parameters associated with the first content transmission. For example, additional encoding parameters of the plurality of encoding parameters can be received in the first content transmission according to a regular interval. An example interval can comprise one encoding parameter for every content frame, group of content frames (e.g., group of pictures), transmission block, and the like.

In one aspect, the encoding parameter can comprise at least one of an encoding quantization level, a predictive frame error, a relative size of an inter-coded frame with respect to an intra-coded frame, a number of motion vectors to encode a frame, a quantizing step size, and the like. In another aspect, the encoding parameter can comprise a value indicating at least one of a low complexity to encode, a medium complexity to encode, and a high complexity to encode. The encoding parameter can comprise a numerical count, an average, a categorization, and the like, of information about the encoding of all or a portion of the first content stream. In one aspect, one or more encoding parameters can be aggregated in to a byte field (e.g., 1-2 byte field) and carried in the content transmission in a field, such as a private adaptation field.

At step 504, the encoding parameter can be compared to a previous encoding parameter. The previous encoding parameter can be indicative of a level of complexity to encode the first content transmission at a previous time. For example, trends or changes in the encoding parameter can be determined over a time interval.

At step 506, a second content transmission (e.g., second content stream) can be selected. For example, the second content transmission can be selected based on the encoding parameter. In some scenarios, the second content transmission can be selected based on one or more other encoding parameters associated with the first content stream, the second content transmission, a fourth content transmission, or other content transmission. In one aspect, the second content transmission can be selected to adjust bandwidth allocation within a third content transmission (e.g., modulated and/or multiplexed content stream) for at least one of the first content transmission and a fourth content transmission. In one aspect, the second content transmission can be encoded at a bit rate (e.g., second bit rate) that is different than a bit rate (e.g., first bit rate) of the first content transmission. In another aspect, the second content transmission can be selected based on a difference between the encoding parameter and the previous encoding parameter. In one aspect, the difference between the encoding parameter and the previous encoding parameter can identify a trend in the level of difficulty to encode. The second content transmission can be selected based on the trend indicating an increase or a decrease in the level of difficulty to encode. As another example, the second content transmission can be selected based on a comparison of the encoding parameter to a threshold.

In one aspect, the first content transmission can be a source transmission (e.g., source stream) encoded at the first bit rate and the second content transmission can be the source transmission encoded at the second bit rate. For example, the first content transmission and the second content transmission are configured as transmissions (e.g., streams) of an adaptive bit rate transmission (e.g., adaptive bit rate transmission).

At step 508, a third content transmission (e.g., modulated and/or multiplexed content transmission, such as content stream) can be generated. The third content transmission can comprise the second content transmission. In one aspect, the third content transmission can also comprise the first content transmission. For example, the first content transmission can comprise first content. The second content transmission can comprise second content. In one aspect, the second content transmission can comprise the same content as the fourth content transmission (e.g., but at different bit rates).

In one aspect, the first content transmission can be associated with a first bandwidth priority. The second content transmission can be associated with a second bandwidth priority. For example, a low priority level can indicate that the content transmission can be decreased to a lower bit rate for the third content transmission. A higher priority level can indicate that the content stream can be increased to a higher bit rate for the third content transmission. In one aspect, the second bandwidth priority can be lower than the first bandwidth priority.

Figure 6:
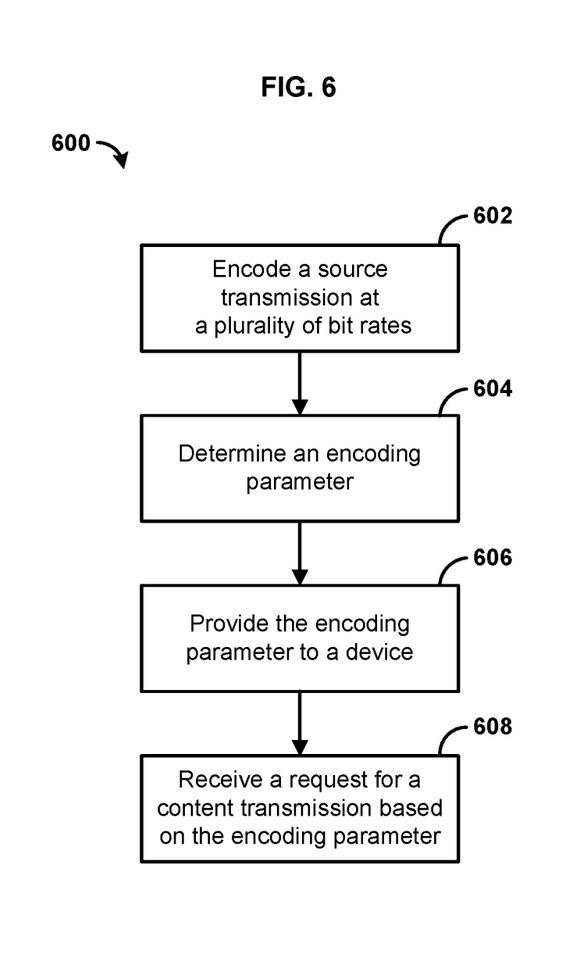
FIG. 6 is a flowchart illustrating another example method for providing content.

FIG. 6 is a flowchart illustrating another example method 600 for providing content. At step 602, a source transmission (e.g., source content stream) can be encoded at a plurality of bit rates. For example, a first content transmission and a second content transmission can be encoded. As a further example, the first content transmission can comprise the source transmission encoded at one (e.g., first bit rate) of the plurality of bit rates. As another example, the second content transmission can comprise the source transmission encoded at another (e.g., second bit rate) of the plurality of bit rates. Additionally, a fourth content transmission can be encoded based on an additional source transmission. In some scenarios, the second content transmission can be encoded based on the additional source transmission. For example, the second content transmission can comprise the additional source transmission encoded at the second bit rate. The fourth content transmission can comprise the additional source transmission encoded at a third bit rate. In some scenarios, the third bit rate can be the same as the first bit rate.

At step 604, an encoding parameter can be determined. The encoding parameter can be indicative of a level of complexity to encode the first content transmission. The encoding parameter can comprise a numerical count, an average, a categorization, and the like, of information about encoding of all or a portion of the first content transmission. For example, the encoding parameter can comprise at least one of an encoding quantization level, a predictive frame error, a relative size of an inter-coded frame with respect to an intra-coded frame, a number of motion vectors to encode a frame, a quantizing step size, and the like. As a further example, the encoding parameter can comprise a value indicating at least one of a low complexity to encode, a medium complexity to encode, and a high complexity to encode.

At step 606, the encoding parameter can be provided to a device. For example, the encoding parameter can be provided in at least one of a metadata field of the first content transmission and a data transmission (e.g., data stream) separate from the first content transmission. In one aspect, the metadata field of the first content transmission can comprise a private adaptation field of the first content transmission. In one aspect, the encoding parameter can be one of a plurality of encoding parameters provided in and/or associated with the first content transmission. For example, additional encoding parameters of the plurality of encoding parameters can be provided in the first content transmission according to a regular interval. An example interval can comprise one encoding parameter for every content frame, group of content frames (e.g., group of pictures), transmission block, and the like.

In one aspect, the device can comprise a statistical multiplexer. For example, the device can be configured to generate a third content transmission (e.g., modulated and/or multiplexed content stream) comprising the first content transmission and the second content transmission. As a further example, the statistical multiplexer can be configured to request the second content transmission to adjust bandwidth allocation within the third content transmission for at least one of the first content transmission and a fourth content transmission. In one aspect, the second content transmission can comprise the same content as the fourth content transmission.

At step 608, a request for a content transmission (e.g., content stream) based on the encoding parameter can be received. For example, the request can be a request for a second content transmission. The request can be received from the device. In some scenarios, the request for the second content transmission can be based on one or more other encoding parameters associated with the first content transmission, the second content transmission, the fourth content transmission, or other content transmission. The second content transmission can be encoded at a bit rate that is different than a bit rate of the first content transmission. In one aspect, the device can be configured to compare the encoding parameter to a previous encoding parameter indicative of a level of complexity to encode the first content transmission at a previous time. For example, the request from the device for the second content transmission can be based on a difference between the encoding parameter and the previous encoding parameter.

In one aspect, the device can be configured to determine trends or changes in the encoding parameter over a time interval. For example, the difference between the encoding parameter and the previous encoding parameter can identify a trend in the level of difficulty to encode. The content transmission can be requested based on the trend indicating an increase or a decrease in a level of difficulty to encode. As another example, the content transmission can be requested based on a comparison of the encoding parameter to a threshold.

In one aspect, the first content transmission can comprise first content and the second content transmission can comprise second content. The first content transmission can be associated with a first bandwidth priority and the second content transmission can be associated with a second bandwidth priority. For example, a low priority level can indicate that a content transmission can be decreased to a lower bit rate for the third content transmission. A higher priority level can indicate that a content transmission can be increased to a higher bit rate for the third content transmission. In one aspect, the second bandwidth priority can be lower than the first bandwidth priority.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
    receiving an encoding parameter associated with a first content stream associated with a first bandwidth priority, wherein the encoding parameter indicates a change in a level of complexity to encode the first content stream;
    receiving, based on the change in the level of complexity and an allocation of bandwidth within a first modulated content stream comprising the first content stream and a second content stream, a third content stream associated with a second bandwidth priority; and
    generating a second modulated content stream comprising the first content stream and the third content stream.

2. The method of claim 1, wherein receiving the encoding parameter comprises receiving the encoding parameter in a private adaption metadata field.

3. The method of claim 1, wherein the change in the level of complexity comprises an increase in the level of complexity or a decrease in the level of complexity.

4. The method of claim 1, wherein the encoding parameter comprises at least one of: an encoding quantization level, an encoding complexity parameter, a quantization coefficient level, a prediction error parameter, a motion vector parameter, or a frame comparison parameter.

5. The method of claim 1, wherein receiving the third content stream comprises receiving a version of the second content stream at a different bit rate.

6. The method of claim 1, wherein receiving the third content stream comprises increasing the allocation of bandwidth of the first content stream within the first modulated content stream.

7. The method of claim 1, further comprising sending the second modulated content stream to a computing device.

8. A method comprising:
    determining, based on an encoding parameter, a change to a level of complexity to encode a first content stream associated with a first bandwidth priority;
    determining a second content stream associated with a second bandwidth priority; and
    generating, based on the change in the level of complexity and the second bandwidth priority, a third content stream.

9. The method of claim 8, wherein determining the change to the level of complexity comprises determining an increase in the level of complexity or a decrease in the level of complexity.

10. The method of claim 8, wherein the encoding parameter comprises at least one of: an encoding quantization level, an encoding complexity parameter, a quantization coefficient level, a prediction error parameter, a motion vector parameter, or a frame comparison parameter.

11. The method of claim 8, wherein determining the second content stream comprises determining the second content stream based on the first bandwidth priority and the second bandwidth priority.

12. The method of claim 8, wherein the first bandwidth priority is associated with a first bit rate of the first content stream and the second bandwidth priority is associated with a second bit rate of the first content stream.

13. The method of claim 8, wherein determining the third content stream comprises determining that the third content stream comprises content of the first content stream that is encoded at a lower bit rate or a higher bit rate than a bit rate of the first content stream.

14. The method of claim 8, further comprising sending the third content stream to a computing device.

15. A method comprising:
    receiving a first modulated content stream comprising a first content stream and a second content stream, wherein the second content stream is encoded at a first bit rate and associated with a first bandwidth priority;
    determining, based on an encoding parameter and a bandwidth threshold, a third content stream that is encoded at a second bit rate and associated with a second bandwidth priority; and
    generating a second modulated content stream comprising the first content stream and the third content stream.

16. The method of claim 15, wherein the determining third content stream comprises determining the third content stream based on the first bandwidth priority and the second bandwidth priority.

17. The method of claim 15, wherein the encoding parameter comprises at least one of: an encoding quantization level, an encoding complexity parameter, a quantization coefficient level, a prediction error parameter, a motion vector parameter, or a frame comparison parameter.

18. The method of claim 15, wherein the bandwidth threshold defines a bandwidth allocated to the first content stream or the second content stream within the first modulated content stream.

19. The method of claim 15, wherein the determining the second modulated content stream comprises determining that the third content stream comprises content of the second content stream that is encoded at the second bit rate, and wherein the second bit rate is a lower bit rate or a higher bit rate than the first bit rate of the second content stream.

20. The method of claim 15, further comprising sending the second modulated content stream to a computing device.

* * * * *